United States Patent
Brunet et al.

(10) Patent No.: US 11,827,204 B2
(45) Date of Patent: Nov. 28, 2023

(54) DEVICE AND METHOD FOR ENABLING SOC CALIBRATION IN AN ELECTRICAL ENERGY STORAGE SYSTEM OF A HYBRID ELECTRIC VEHICLE

(71) Applicant: VOLVO TRUCK CORPORATION, Gothenburg (SE)

(72) Inventors: Simon Brunet, Landvetter (SE); Tommy Hjelle, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 69 days.

(21) Appl. No.: 17/456,447

(22) Filed: Nov. 24, 2021

(65) Prior Publication Data

US 2022/0169230 A1    Jun. 2, 2022

(30) Foreign Application Priority Data

Nov. 27, 2020  (EP) ..................... 20210301

(51) Int. Cl.
| | | |
|---|---|---|
| *B60W 10/08* | (2006.01) | |
| *B60L 58/12* | (2019.01) | |
| *B60W 10/06* | (2006.01) | |
| *B60W 10/26* | (2006.01) | |

(52) U.S. Cl.
CPC .............. *B60W 10/08* (2013.01); *B60L 58/12* (2019.02); *B60W 10/06* (2013.01); *B60W 10/26* (2013.01); *B60L 2240/547* (2013.01); *B60W 2510/244* (2013.01)

(58) Field of Classification Search
CPC ...... B60W 10/08; B60W 10/06; B60W 10/26; B60W 2510/244; B60L 58/12; B60L 2240/547
See application file for complete search history.

(56) References Cited

U.S. PATENT DOCUMENTS

| | | | |
|---|---|---|---|
| 5,828,201 A | 10/1998 | Hoffman, Jr. et al. | |
| 2009/0114463 A1 | 5/2009 | DeVault | |
| 2015/0094894 A1 | 4/2015 | Ito et al. | |
| 2019/0210588 A1* | 7/2019 | Murakami | B60W 10/08 |

FOREIGN PATENT DOCUMENTS

| | | |
|---|---|---|
| CN | 1437031 A | 8/2003 |
| CN | 105277909 B | 6/2018 |
| WO | 2014202172 A2 | 12/2014 |
| WO | 2015021998 A1 | 2/2015 |

OTHER PUBLICATIONS

European Search Report dated May 28, 2021 in corresponding European Patent Application No. 20210301.6, 11 pages.

\* cited by examiner

*Primary Examiner* — Grant Moubry
*Assistant Examiner* — Ruben Picon-Feliciano
(74) *Attorney, Agent, or Firm* — Venable LLP; Jeffri A. Kaminski (57) ABSTRACT

A device for enabling SOC estimation of at least one battery cell in an electrical energy storage system of a hybrid electric vehicle. The device initiates charging of the battery cell to a first voltage level. The battery cell is charged by an electric machine powered by a combustion engine. The device detects that the first voltage level is reached, initiates stop of fuel injection to the combustion engine. The device initiates discharging of the at least one battery to a second voltage level. The device detects that the battery cell has been discharged to a second voltage level. SOC estimation of the battery cell is enabled when the second voltage level has been reached.

15 Claims, 8 Drawing Sheets

DEVICE AND METHOD FOR ENABLING SOC CALIBRATION IN AN ELECTRICAL ENERGY STORAGE SYSTEM OF A HYBRID ELECTRIC VEHICLE

TECHNICAL FIELD

The invention relates to a device, a method performed by the device, a hybrid electric vehicle comprising the device, a computer program and a computer readable medium. More particularly, the invention relates to enabling State of Charge (SOC) estimation of at least one battery cell comprised in an electrical energy storage system of a hybrid electric vehicle.

The invention can be applied in hybrid vehicles, also referred to as partly electric vehicles, e.g. heavy-duty vehicles, such as trucks, buses and construction equipment etc. Although the invention will be described with respect to a hybrid electrified truck, the invention is not restricted to this particular vehicle, but may also be used in other vehicles such as buses, trailers, wheel loaders, articulated haulers, excavators, backhoe loaders, passenger cars, marine vessels etc. It may also be applied in electrical systems of e.g. hybrid vessels and in various industrial construction machines or working machines.

BACKGROUND

A hybrid vehicle is hybrid in the sense that an electric machine and a combustion engine are used to power and drive the vehicle. The electric machine and the combustion engine may operate in combination or independent of each other. A hybrid vehicle may also be referred to as a partly electric vehicle. The hybrid vehicle comprises one or more high voltage batteries which provides power to the electric machine. Fuel, e.g. diesel or gasoline, is used to power the combustion engine. The hybrid vehicle may comprise other batteries used to power auxiliary devices in the vehicle such as e.g. the radio, lights, seat heating etc. The batteries used to power the electric machine are of higher voltage than the batteries used to power the auxiliary devices. The batteries used to power the electric machine may therefore be referred to as high voltage batteries and the batteries used to power the auxiliary device may be referred to as low voltage batteries.

The high voltage battery may be comprised in the hybrid vehicle's electrical Energy Storage System (ESS). A high voltage battery comprises one or more battery cells arranged in any suitable configuration.

The SOC level of a battery cell is parameter indicating the level of charge of the battery cell relative to its capacity, i.e. it reflects the performance of the battery cell. The SOC may be described as a measurement of how much energy that is left in a battery cell. An empty or fully discharged battery cell may have an SOC of 0 or 0%. A fully charged battery cell may have an SOC of 1 or 100%.

The SOC of the battery cell cannot be directly measured. Instead, the SOC of the battery cell is estimated. There are many known methods for estimating the SOC. Battery SOC estimation may for example rely on methods, sometimes referred to as SOC algorithms, based on measuring voltage, current and temperature. Due to the accuracy of these measurements, the SOC estimation will slowly drift from the real or actual SOC over time. To avoid the SOC estimation drift, is it needed to regularly calibrate or reset the SOC algorithm used for estimating the SOC. The calibration of the SOC algorithm is done for example by letting the battery cell rest for some time. After this time, the voltage of the battery cell may be considered stable and the SOC may be estimated with a good accuracy from the Open Circuit Voltage (OCV). Today, this may be done automatically when the hybrid vehicle is in off mode, i.e. when the ignition has been turned off, for longer than a period of time, e.g. in the range of 4-6 h. Sometimes, disturbances perturbate the calibration of the SOC algorithm such that it is not performed sufficiently. An example of such disturbance may be that the hybrid vehicle is not turned off for a long enough time period. When this happens too often, it will be difficult to calibrate the SOC algorithm and help from an external current or voltage generator is needed. In a hybrid vehicle, this external help can come from the combustion engine powering the electric machine which delivers current.

Instead of using the combustion engine, an external charger may be connected to the battery cell to produce a specified current pattern. However, it is expensive and unnecessary to purchase such external charger when a combustion engine and electric machine is already available in the hybrid vehicle. Adding an external charger also increases the complexity and the risk of component failure of the hybrid vehicle.

Therefore, there is a need to at least mitigate or solve these issues.

SUMMARY

An object of the invention is to improve SOC estimation in a hybrid electric vehicle.

According to a first aspect of the invention, the object is achieved by a method according to claim 1. The method is performed by a device and is for enabling SOC estimation of at least one battery cell comprised in an electrical energy storage system of a hybrid electric vehicle. The device initiates charging of the at least one battery cell to a first voltage level. The at least one battery cell is charged by an electric machine powered by a combustion engine comprised in the hybrid electric vehicle. The device detects that the first voltage level is reached. When the first voltage level is reached, the device initiates stop of fuel injection to the combustion engine and initiates discharging of the at least one battery cell to a second voltage level. The electric machine drives the combustion engine with power from the at least one battery cell during the discharging. The at least one battery cell is discharged when used for driving the combustion engine. The device detects that the at least one battery cell has been discharged to the second voltage level. The SOC estimation of the at least one battery cell is enabled when the second voltage level has been reached.

By the provision of the method, the advantage of improving SOC estimation in the hybrid electric vehicle is provided. After charging to the first voltage level, and then discharging to the second voltage level, the at least one battery cell is in a charging state that is a starting point for the SOC estimation that would lead to an SOC estimation that is correct or as correct as possible. There is no need for having the vehicle in off mode for a long time period, there is no need for any external current or voltage, nor of any external charger in order to enable the SOC estimation. Charging of the at least one battery cell to a first voltage level and discharging to the second voltage level may ensure proper SOC estimation.

According to one embodiment, when the at least one battery cell has been discharged to the second voltage level, the device may estimate the SOC of the at least one battery cell. The SOC may be estimated using any suitable method. An advantage of estimating the SOC of the at least one battery cell may be to provide an indication of the performance of the at least one battery cell. The estimated SOC may provide a measurement of how much energy that is left in the at least one battery cell, and the measurement may be utilized in providing indications related to when charging of the at least one battery should be performed.

According to one embodiment, upon detecting that the second voltage level has been reached, the device may initiate charging of the at least one battery cell to a predetermined SOC level using the electric machine powered by the combustion engine driven by fuel. With this, the hybrid electric vehicle is ready to be driven by means of power from the at least one battery cell.

According to a further embodiment, upon detecting that the first voltage level has been reached, the device may postpone initiation of the discharging of the at least one battery cell for a first time period. No current may be provided to the electric machine from the at least one battery cell during the first time period. An advantage of the first time period, i.e. a first pause period, is that it allows the first voltage level to relax and stabilize which increases the accuracy of a future voltage measurement, and possibly also other future measurements such as current, temperature etc.

According to a further embodiment, upon detecting that the second voltage level has been reached, the device may postpone the initiating of the charging of the at least one battery cell to the predetermined SOC level for a second time period. No current may be provided to the electric machine from the at least one battery cell during the second time period. An advantage of the second time period, i.e. a second pause period, is that it allows the second voltage level to relax and stabilize which increases the accuracy of a future voltage measurement, and possibly also future measurements such as current, temperature etc.

According to another embodiment, the information indicating at least one of voltage, current and temperature of the at least one battery cell may be obtained a first time period after the first voltage level has been reached and a second time period after the second voltage level has been reached. An advantage of obtaining the information a first time period and a second time period after the respective voltage levels has been reached may be to let the voltage levels stabilize. Stabile voltage levels are more accurate measurements.

According to a further embodiment, the first voltage level may be higher than the second voltage level.

According to a further embodiment, the at least one battery cell may be comprised in at least one traction voltage battery.

According to a further embodiment, the device may be a battery management unit, or it may be comprised in a battery management unit of the electrical energy storage system. An advantage of the battery management unit may be that it is located in geographic proximity to the at least one battery cell. Furthermore, the battery management unit may be an already existing unit of the hybrid electric vehicle's electrical energy storage system performing other tasks related to battery management, which does not add any extra units or complexity as compared to the device being a separate and dedicated unit for the purpose of the SOC calibration.

According to a further embodiment, the method may be performed while the hybrid electric vehicle is at standstill and no auxiliaries loads comprised in the hybrid electric vehicle are running. The first voltage level and the second voltage level at which the battery cell is charged and discharged are so high and low, respectively, that the current flowing in and out the battery cell has to be very low. This is not possible if the hybrid electric vehicle is driving because then there is no control of the current in that case, i.e. the current will depend on the driver's accelerator pedal position.

The device is adapted to perform the method described above. Advantages and effects of the second aspect of the invention are similar to the advantages and effects with respect to the first aspect of the invention. It shall also be noted that all embodiments of the first aspect of the invention are applicable to and combinable with all embodiments of the second aspect of the invention and vice versa.

According to a third aspect of the invention, the hybrid electric vehicle comprises the device described above. Advantages and effects of the third aspect of the invention are similar to the advantages and effects with respect to the first aspect of the invention. It shall also be noted that all embodiments of the first aspect of the invention are applicable to and combinable with all embodiments of the third aspect of the invention and vice versa.

According to a fourth aspect of the invention, the computer program comprises instructions which, when executed on at least one processor, cause the at least one processor to carry out the method according to the first aspect.

According to a fifth aspect of the invention, the carrier comprises the computer program of the fourth aspect, wherein the carrier is one of an electronic signal, optical signal, radio signal or computer readable storage medium.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

As mentioned above, there is a problem of SOC calibration not being performed automatically, e.g. when the hybrid electric vehicle is not off for a long enough time period, which leads to a need to connect an external charger to perform the calibration SOC algorithm. The present invention performs SOC calibration of the SOC algorithm. The SOC algorithm may be described as method for estimating the SOC. The SOC calibration may be referred to as resetting the SOC algorithm of the at least one battery cell. A result of calibrating the SOC algorithm, may be described as setting the at least one battery cell in a charging state that is a suitable starting point for performing SOC estimation. The calibration of the SOC algorithm is performed by first charging the at least one battery cell to a first voltage level with the electric machine with power from a combustion engine. Fuel injection to the combustion engine is stopped when the first voltage level is reached, and the electric machine drives the combustion engine with power form the at least one battery cell. When the at least one battery cell is discharged to a second voltage level while being used for driving the combustion engine, the SOC estimation is enabled and ready to be performed. It is easier to estimate the SOC at the first voltage level and the second voltage level, as compared to other voltage levels. With a pause period between the first voltage level and the second voltage level and with no running auxiliaries loads, the voltage of the at least one battery cell may be considered stable and then the SOC estimation is enabled and ready to be performed with a correct and controlled starting point. The present invention uses the combustion engine and the electric machine that is already comprised in the hybrid electric vehicle.

Figure 1:
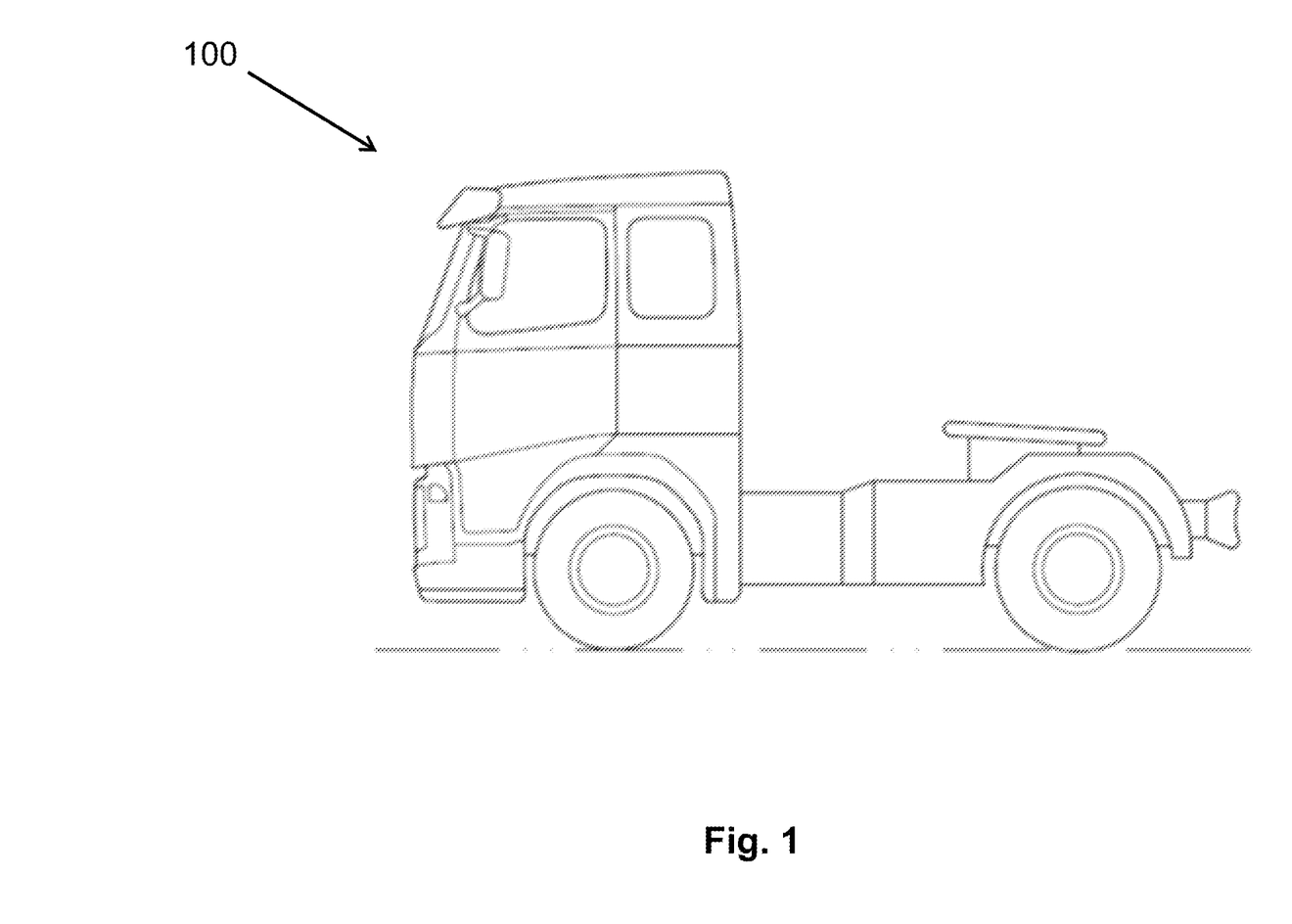
FIG. 1 is a is a schematic drawing illustrating a hybrid electric vehicle.

FIG. 1 illustrates a hybrid electric vehicle 100. The hybrid electric vehicle 100 is hybrid in that two types of power is used for driving the hybrid electric vehicle 100 such as an electric machine and a combustion engine. Sometimes, the hybrid electric vehicle 100 is only driven by the electric machine, sometimes only by the combustion engine and sometimes the electric machine and the combustion engine work together to drive the hybrid electric vehicle 100. The term vehicle or hybrid vehicle may be used herein for the sake of simplicity when referring to the hybrid electric vehicle 100. The hybrid electric vehicle 100 may be without plug-in. The electric machine may be referred to as an electric motor.

The hybrid electric vehicle 100 may be a heavy-duty vehicle, such as a truck, bus, construction equipment, trailer, wheel loader, excavator, passenger car, a marine vessel, an electrically operated vessel, a working machine, stationary backup power solution etc., or any other type of vehicle mentioned herein.

Figure 2:
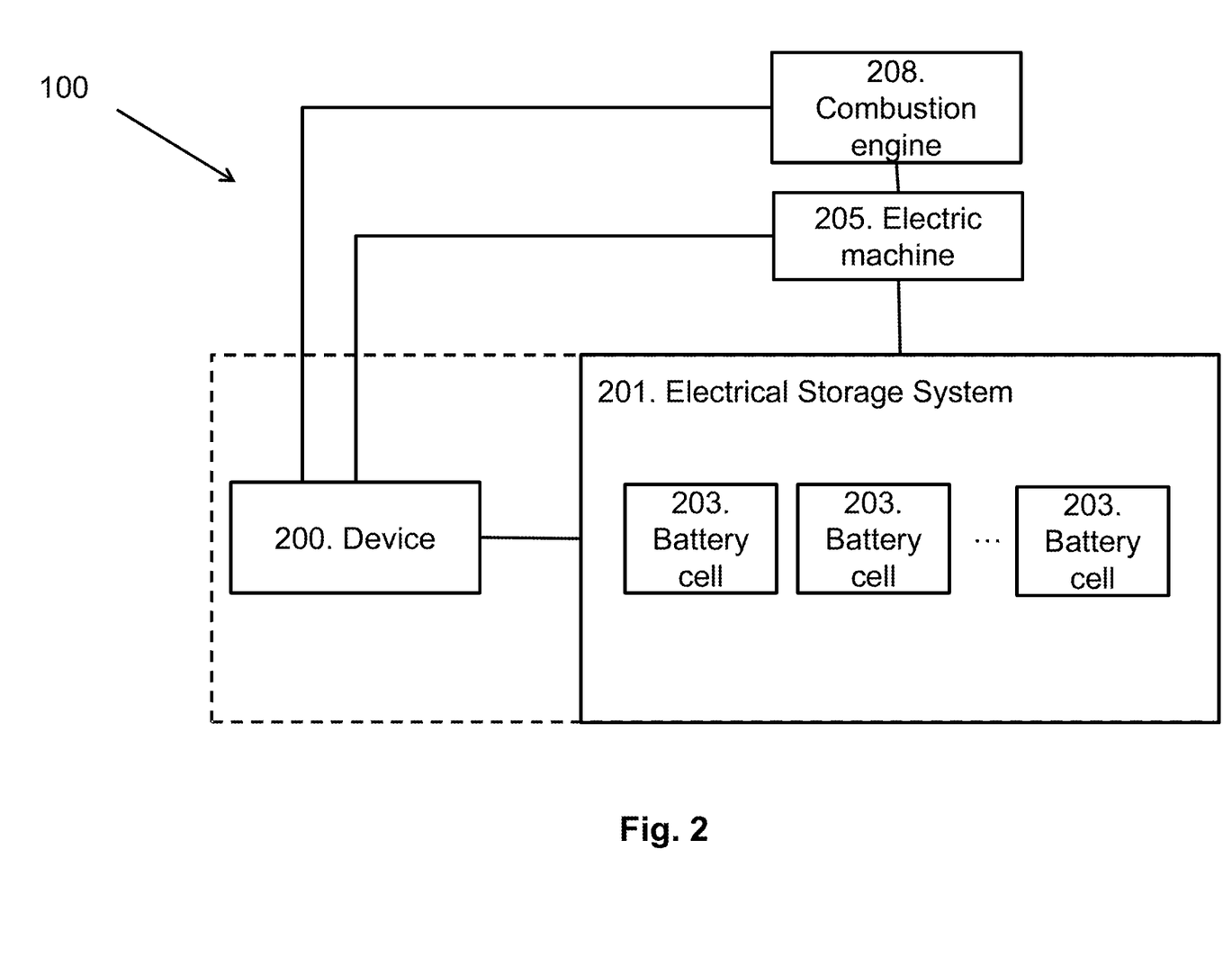
FIG. 2 is a block diagram illustrating a hybrid electric vehicle.

FIG. 2 is a schematic block diagram illustrating the hybrid electric vehicle 100. Note that the units in FIG. 2 are illustrated for the sake of simplicity, and that the hybrid electric vehicle 100 may comprise other units in addition to or instead of the ones illustrated in FIG. 2.

The hybrid electric vehicle 100 comprises a device 200. The device 200 may be adapted to control, monitor or control and monitor charging of the at least one battery cell 203 comprised in an electrical energy storage system 201 of the hybrid electric vehicle 100. The electrical energy storage system 201 may be referred to as an electric storage system or electrical storage system for the sake of simplicity. The device 200 may be partly or completely comprised in the electric hybrid vehicle 100, or it may be external to and adapted to be connected to the electric hybrid vehicle 100. The device 200 may be a standalone and separate device adapted to perform the method described herein, or it may be combined or co-located with an already existing unit. The device 200 may be a battery management unit or it may be comprised in a battery management unit. The device 200 may be comprised in the electrical energy storage system 201 of the hybrid electric vehicle 100 (illustrated with the dotted lines), or it may be a separate device adapted to be connected to the electrical energy storage system 201. The device 200 may be referred to as a control device, management unit or battery management unit.

As mentioned above, the electrical energy storage system 201 comprises at least one battery cell 203. Three battery cells 203 are illustrated as an example in FIG. 2, but the hybrid electric vehicle 100 may comprise any n number of battery cells 203, where n is a positive integer. When the hybrid electric vehicle 100 comprises multiple battery cells 203, then these battery cells 203 may be arranged with respect to each other in any suitable configuration, e.g. a serial configuration, a parallel configuration etc. The at least one battery cell 203 may be comprised in a battery, also referred to as a battery pack, and the battery may be comprised in the electrical energy storage system 201. There may be one, two or more batteries comprised in the electrical energy storage system 201, and each battery may comprise at least one battery cell 203. The battery may be referred so as an electric battery. The at least one battery cell 203 is a rechargeable battery cell 203. Consequently, a battery comprising at least one battery cell 203 is a rechargeable battery. The at least one battery cell 203 is connected to, directly or indirectly, the device 200, via for example a wired connection or a wireless connection.

The at least one battery cell 203, also referred to as a traction battery cell, may be of any suitable type such for example lithium-ion battery cell, lithium polymer battery cell, fuel-cell, lead-acid battery cell, nickel metal hydride battery cell etc. The at least one battery cell 203 may generate current in Direct Current (DC) form and needs DC current to be charged. The at least one battery cell 203 may be a high voltage battery cell adapted to power and drive the hybrid electric vehicle 100, which is different from the hybrid electric vehicle's low voltage battery cell used to power the auxiliary loads of the hybrid electric vehicle 100. The low voltage battery cell may be a 12V battery cell. The high voltage battery cell may operate in the range of 100V-200V, 200-400V, 400V-800V, 400-1000V, or any other suitable voltage range.

The hybrid electric vehicle 100 comprises an electric machine 205 and the combustion engine 208.

The electric machine 205 and the device 200 are adapted to be connected to each other, for example via one or more wireless or wired connections. The electric machine 205 and the at least one battery cell 203 are adapted to be connected to each other, for example via one or more wireless or wired connections. The electric machine 205 and the electrical energy storage system 201 are adapted to be connected to each other, for example via one or more wireless or wired connections. The electric machine 205 may be adapted to drive the hybrid electric vehicle 100 alone with power from the at least one battery cell 203 or in combination with the combustion engine 208.

The combustion engine 208 may be described as an engine adapted to generate power by combustion of fuel, e.g. diesel, gasoline etc. The combustion engine 208 is adapted to drive the hybrid electric vehicle 100 alone or in combination with the electric machine 205. The combustion engine 208 is adapted to power the electric machine 205, e.g. when the at least one battery cell 203 is discharged or disconnected. The combustion engine 208 and the electric machine 205 are adapted to be connected to each other, for example via one or more wireless or wired connections. The combustion engine 208 and the device 200 are adapted to be connected to each other, for example via one or more wireless or wired connections The combustion engine 208 may be in combustion mode or in non-combustion mode. The combustion mode may be a first mode and the non-combustion mode may be a second mode. When the combustion engine 208 is in combustion mode, then it is powered by fuel, e.g. diesel or gasoline. When the combustion engine 208 is in non-combustion mode, then it is powered by the electric machine 205 being driven by the at least one battery cell 203.

The at least one battery cell 203 may be adapted to be charged by means of a charger (not shown), e.g. an onboard charger or an offboard charger, or by means of the electric machine 205 with power from the combustion engine 208.

SOC calibration of the at least one battery cell 203 is performed for the at least one battery cell 203 to provide stable and predictable voltage to the electric machine 205 such that the hybrid electric vehicle 100 can drive. The disclosure herein uses the term SOC calibration of at least one battery cell 203, and this comprises SOC calibration of any n number of battery cells 203, where n is a positive integer. In case of enabling SOC calibration of for example two or more battery cells 203, the present disclosure is equally applicable as for SOC calibration of one battery cell 203. This means that in an example with two or more battery cells 203 comprised in a battery, e.g. a battery pack, then the present invention enables SOC calibration of all or at least some of the two or more battery cells 203 comprised in the battery in the electrical energy storage system 201.

Figure 3A:
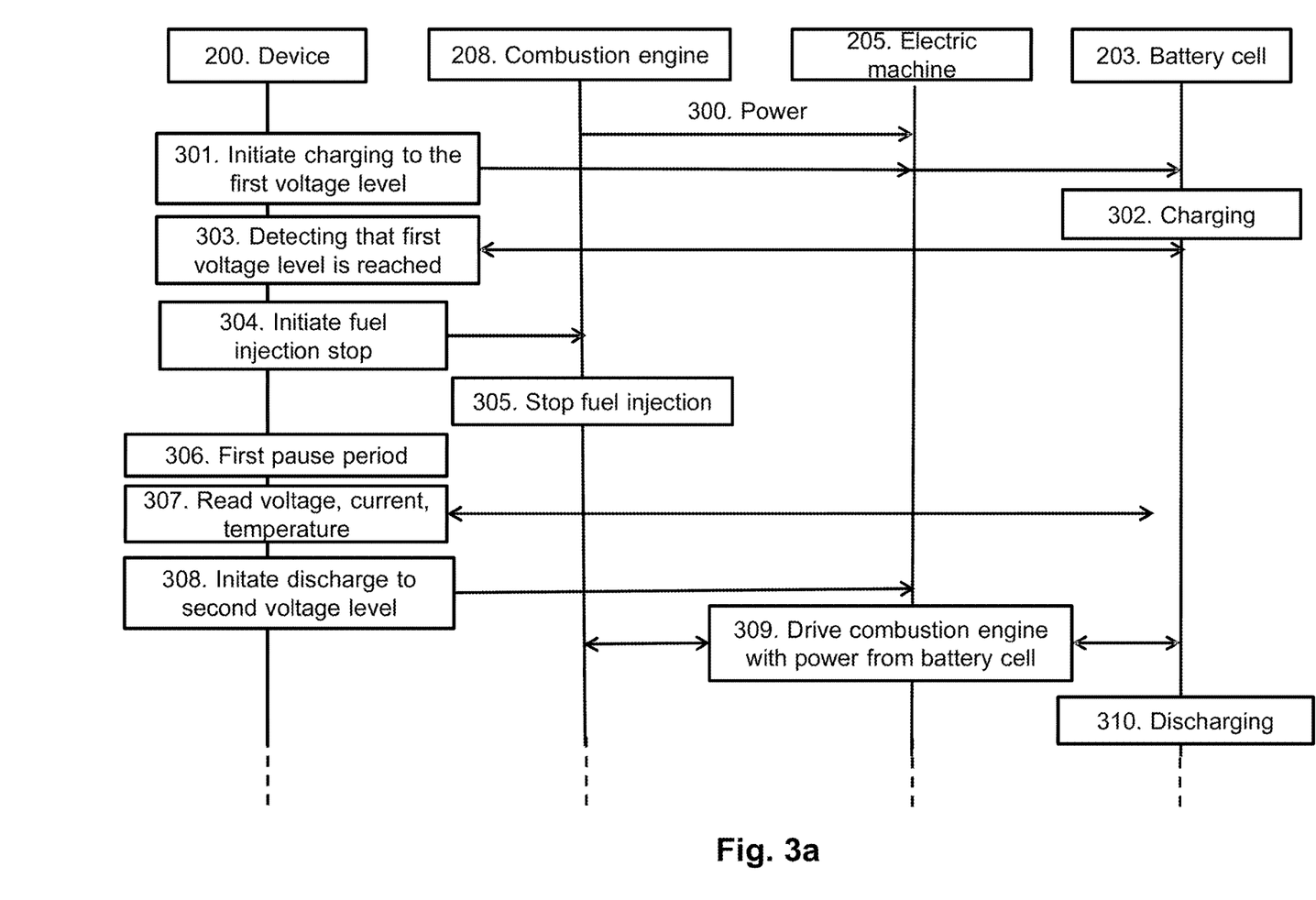
FIG. 3a, 3b are signalling diagrams illustrating a method.
Figure 3B:
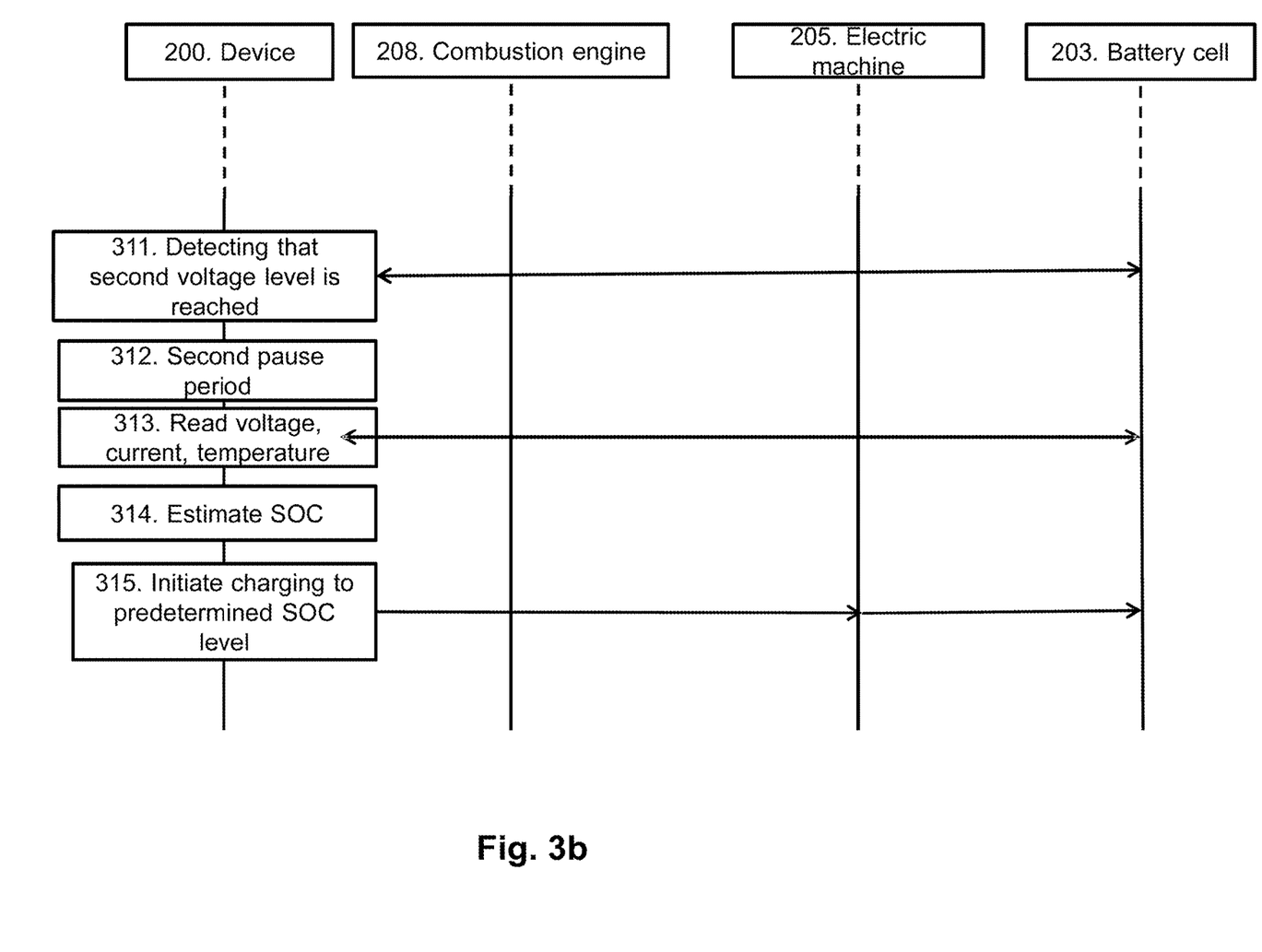

FIG. 3a and FIG. 3b are a signalling diagrams illustrating method for enabling SOC estimation of at least one battery cell 203 comprised in an electrical energy storage system 201 of a hybrid electric vehicle 100. FIG. 3b is a continuation of FIG. 3a. FIG. 3a illustrates steps 300-310 and FIG. 3b illustrates steps 311-315. The hybrid electric vehicle 100 is in standstill mode when the method is performed, i.e. it is not moving. When the method is performed, there may be no auxiliaries loads comprised in the hybrid electric vehicle 100 that are running, e.g. fan, compressor, etc. A requirement of the method to be performed may be described as a current that is as low as possible, and as allowed by the electric design, shall flow in or out of the at least one battery cell 203 except from the current provided by the combustion engine 105 used for enabling the SOC estimation. The method comprises at least one of the following steps, which steps may be performed in any suitable order than described below:

Step 300

This step is seen in FIG. 3a. The combustion engine 208 provides power to the electric machine 205. The combustion engine 208 is powered with fuel when it provides power to the electric machine 205, i.e. there is a fuel injection into the combustion engine 208.

Step 301

This step is seen in FIG. 3a. The device 200 initiates charging of the at least one battery cell 203 to a first voltage level a. When initiating the charging, the device 200 may send a charging instruction to the electric machine 205. The initiation of the charging may be referred to as triggering the charging. The charging instruction may be in the form of a charging signal, a charging message, a charging trigger signal etc. The first voltage level a may be a high voltage level.

Step 301 may be triggered by obtaining a trigger signal from an aftermark tool, via a cluster, via a trigger signal obtained from an operator device, via an app in a mobile device, e.g. mobile phone, tablet computer etc.

The first voltage level a of the at least one battery cell 230 may be for example 3,65V per battery cell 203.

The electric machine 205 starts charging the at least one battery cell 203 upon reception of the instruction by providing current to the at least one battery cell 203 until the at least one battery cell has reached the first voltage level a. The electric machine 205 is powered by the combustion engine 208, as described in step 300, which makes it able to charge the at least one battery cell 203.

It may be assumed that the at least one battery cell 203 is at a initial voltage level that is lower than the first voltage level a when the charging is started in this step. The initial voltage level may be a startup voltage, and it may be lower or higher than the second voltage level b. The initial voltage level may be 0V or higher.

Figure 4:
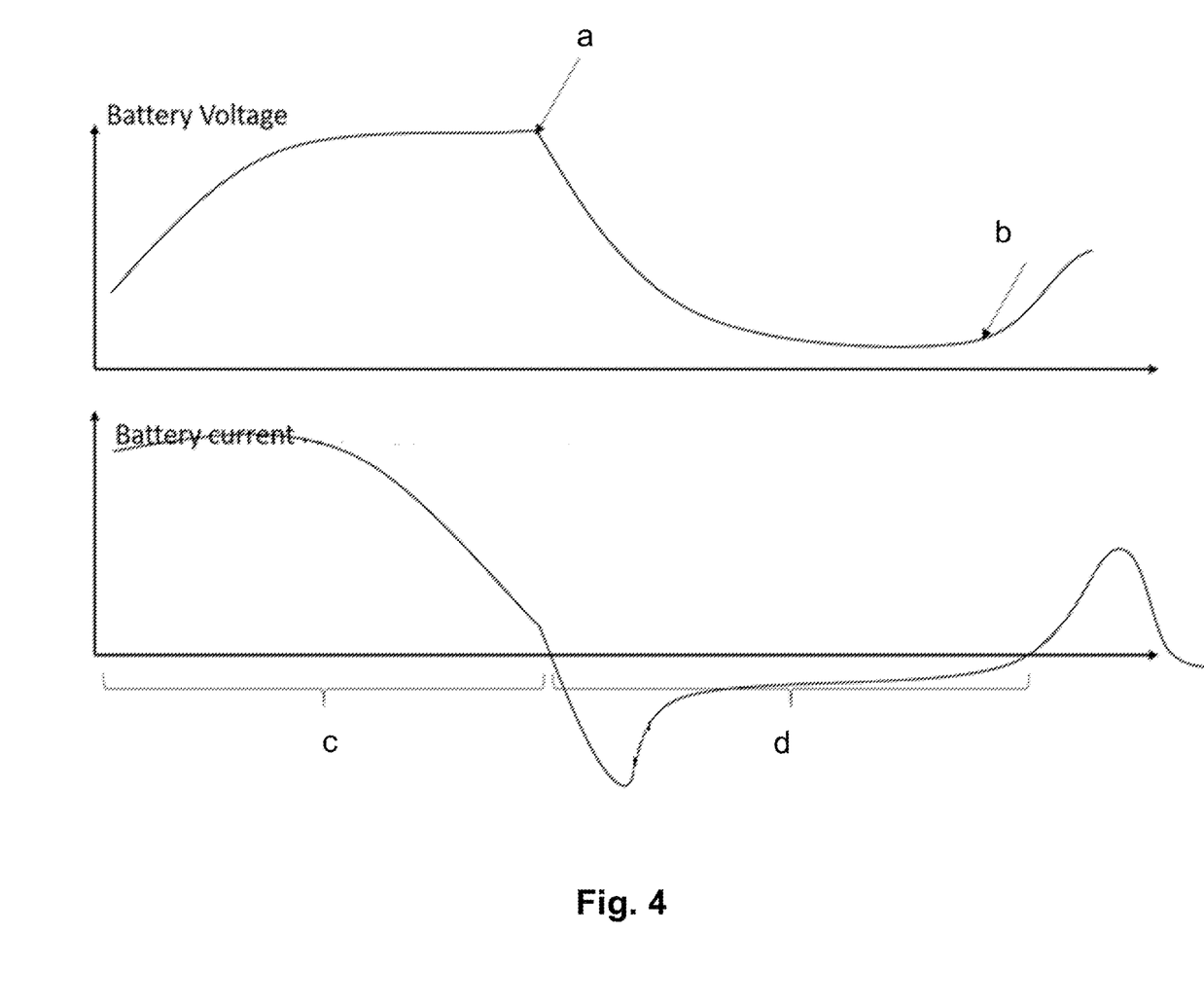
FIG. 4 are graphs illustrating battery cell current and battery cell voltage.

The first voltage level a is exemplified in the top graph in FIG. 4. The top graph in FIG. 4 is a graph showing charging of the at least one battery cell 203 where the x-axis represents time and the y-axis represents battery cell voltage. The bracket c in the bottom graph in FIG. 4 illustrates an example of the current of the at least one battery cell 203 when the electric machine 205 is driven by the combustion engine 208 to produce current to charge the at least one battery cell 203.

Step 302

This step is seen in FIG. 3a. The at least one battery cell 203 receives the charging from the electric machine 205 driven by the combustion engine 208 using fuel, and its voltage level increases until it has reached the first voltage level a.

Step 303

This step is seen in FIG. 3a. The device 200 detects that the first voltage level a is reached. The detection may be a result of that the device 200 may monitor, continuously or in time intervals, the voltage level of the at least one battery cell 203 for example based on information from the voltage sensor comprised in or connected to the at least one battery cell 203 which may provide information to the device 200 when the first voltage level a is reached. The first voltage level a may be a high cell voltage. Detecting that the first voltage level a is reached may be done using any suitable method for voltage level detection.

Step 304

This step is seen in FIG. 3a. When the first voltage level a is reached, the device 200 initiates stop of fuel injection to the combustion engine 208. The device 200 may do this by sending instructions to the combustion engine 208 or to a control unit associated with the combustion engine 208 that that is adapted to control, e.g. to start and stop, fuel injection to the combustion engine 208.

Step 305

This step is seen in FIG. 3a. The fuel injection to the combustion engine 208 is stopped, i.e. the combustion engine 208 does not receive any fuel.

Step 306

This step is seen in FIG. 3a. When the first voltage level a has been detected, the device 200 may initiate a first pause period. In other words, the device 200 pauses or waits an amount of time before proceeding to the following steps, where the amount of time corresponds to the first pause period. A purpose of the first pause period may be to let the voltage level of the at least one battery cell 203 to stabilize.

Step 307

This step is seen in FIG. 3a. The device 200 may read or obtain information indicating at least one of the voltage, current and temperature of the at least one battery cell 203. The device 200 may obtain the information when the first pause period has expired, i.e. the device 200 may wait an amount of time before obtaining the information. By waiting an amount of time before obtaining the information, the voltage, current and temperature of the at least one battery cell 203 may have stabilized and the information obtained by the device 200 may therefore be more accurate.

The at least one battery cell 203 may comprise or may be connected to a voltage sensor. This voltage sensor may provide information about the voltage level of the at least one battery cell 230 to the device 200. The at least one battery cell 203 may comprise or may be connected to a current sensor. This current sensor may provide information about the current level of the at least one battery cell 230 to the device 200. The at least one battery cell 203 may comprise or may be connected to a temperature sensor. This temperature sensor may provide information about the temperature of the at least one battery cell 230 to the device 200.

After the fuel injection to the combustion engine 208 has been stopped, initiation of the electric machine 205 to drive the combustion engine 208 with power from the at least one battery cell 203 may be postponed for the first time period, i.e. there may be a time delay between steps 305 and 308. No current or a current that is as low as possible is provided to the electric machine 205 from the at least one battery cell 203 during the first time period.

During the first time period, there is no fuel injection to the combustion engine 208. The electric machine 205 will not drive the combustion engine 208 with power from the at least one battery cell 203 during the first time period. In other words, both the combustion engine 208 and the electric machine 205 are stopped during the first time period. After the first time period, the electric machine 205 may be used to drive the combustion engine 208, which results in a current being drawn from the at least one battery cell 208 by the electric machine 205 to overcome friction in the combustion engine 208.

During the first time period, it is intended is to have 0 current in and out of the at least one battery cell 203. This means the electric machine 205 should not (re)generate any current. The fuel injection is stop directly or as soon as possible when reaching the first voltage level a and the electric machine 205 may be controlled so that it does not generate any current/torque. After the first time period, i.e. certain delay, the fuel injection is kept at 0, but the electric machine 205 may now be controlled to request torque, thus taking current from the at least one battery cell 208 to drive the combustion engine 208.

Step 308

This step is seen in FIG. 3a. The device 200 may initiate discharging of the at least one battery cell 203 to a second voltage level b.

The second voltage level b is exemplified in the top graph of FIG. 4. The second voltage level may be a low second voltage level which is lower than the first voltage level a. The second voltage level may be for example 2.0V per battery cell 203.

The bracket d in the bottom graph of FIG. 4 illustrates an example of the current of the at least one battery cell 203 when there is stop in the fuel injection to the combustion engine 208 and the electric machine 205 drives the combustion engine 208 leading to discharge of current from the at least one battery cell 203.

This step may also be described as the device 200 initiating the electric machine 205 to drive the combustion engine 208 with power from the at least one battery cell 203. The initiation may be performed by the device 200 by sending instructions to the electric machine 205 to drive the combustion engine 208 with power from the at least one battery cell 203. A goal of using the electric machine 205 to drive the combustion engine 208 is not to drive the powertrain from the combustion engine 208 with combustion fuel, but to waste energy. The powertrain of the vehicle 100 is not driven by the combustion engine 208 with combustion fuel. No fuel will be injected to the combustion engine 208 and the combustion engine 208 will be used backwards. The electric machine 205 will be used to trigger the combustion engine 208 to rotate and friction in the combustion engine 208 will be where energy is wasted.

Step 309

This step is seen in FIG. 3a. The electric machine 205 drives the combustion engine 208 with power from the at least one battery cell 203.

Step 310

This step is seen in FIG. 3a. The at least one battery cell 203 is discharged when being used for providing power to the electric machine 205 to drive the combustion engine 208 down to the second voltage level b.

Step 311

This step is seen in FIG. 3b. The device 200 detects that the at least one battery cell 203 has been discharged to the second voltage level b. The calibration of the SOC algorithm for estimating the SOC of the at least one battery cell 203 is considered to be performed when the second voltage level b has been reached. In other words, the SOC estimation is enabled and ready to be performed, after the charging to the first voltage level a and discharging to the second voltage level b. The detection may be a result of that the device 200 may monitor, continuously or in time intervals, the voltage level of the at least one battery cell 203, for example based on information from a voltage sensor comprised in or connected to the at least one battery cell 203 which may send information to the device 200 when the second voltage level b is reached.

Detecting that the second voltage level b is reached may be done using any suitable method for voltage level detection.

Step 312

This step is seen in FIG. 3b. When the second voltage level b has been detected, the device 200 may initiate a second pause period. In other words, the device 200 pauses or waits an amount of time before proceeding to the following steps, where the amount of time corresponds to the second pause period. A purpose of the second pause period may be to let the voltage level of the at least one battery cell 203 to stabilize.

During the second time period, the fuel injection to the combustion engine 208 is stopped. The electric machine 205 will not drive the combustion engine 208 with power from the at least one battery cell 203 during the second time period. In other words, both the combustion engine 208 and the electric machine 205 are stopped during the second time period.

Step 313

This step is seen in FIG. 3b. The device 200 may read or obtain information indicating at least one of the voltage, current and temperature of the at least one battery cell 203. The device 200 may obtain the information when the second pause period has expired, i.e. the device 200 may wait an amount of time before obtaining the information. By waiting an amount of time before obtaining the information, the voltage, current and temperature of the at least one battery cell 203 may have stabilized and the information obtained by the device 200 may therefore be more accurate.

The at least one battery cell 203 may comprise or may be connected to a voltage sensor. This voltage sensor may provide information about the voltage level of the at least one battery cell 230 to the device 200. The at least one battery cell 203 may comprise or may be connected to a current sensor. This current sensor may provide information about the current level of the at least one battery cell 230 to the device 200. The at least one battery cell 203 may comprise or may be connected to a temperature sensor. This temperature sensor may provide information about the temperature of the at least one battery cell 230 to the device 200.

Step 314

This step is seen in FIG. 3b. The device 200 may estimate the SOC of the at least one battery cell 203. The SOC estimation may be performed using any suitable method.

Step 315

This step is seen in FIG. 3b. When the second voltage level b has been reached, the device 200 may initiate charging of the at least one battery cell 203 to a predetermined SOC level. When the at least one battery cell 203 is at the predetermined SOC level, the hybrid electric vehicle 100 is ready to move. An effect of charging to the predetermined SOC after the second voltage b has been reached may be to ensure that the battery cell 203 is sufficiently charged to enable proper functioning of the electrical machine 205 after standstill. Since the at least one battery cell 203 is the second voltage level b, e.g. a very low voltage level, after step 311, it is an advantage to charge to the predetermined SOC level such that the user can drive the vehicle 100. This step 315 may not be seen as part of the calibration of the SOC algorithm for estimating the SOC.

The initiating of the charging of the at least one battery cell 203 to the predetermined SOC level may be postponed for a second time period after the second voltage level has been reached, as described above in step 312. Postponing the initiating of the charging may be described as delaying the initiating, or to have a second pause period between the completion of the SOC calibration and the start of the charging to the predetermined SOC level. No current or as little current as possible is provided to the electric machine 205 from the at least one battery cell 203 during the second time period.

Figure 5:
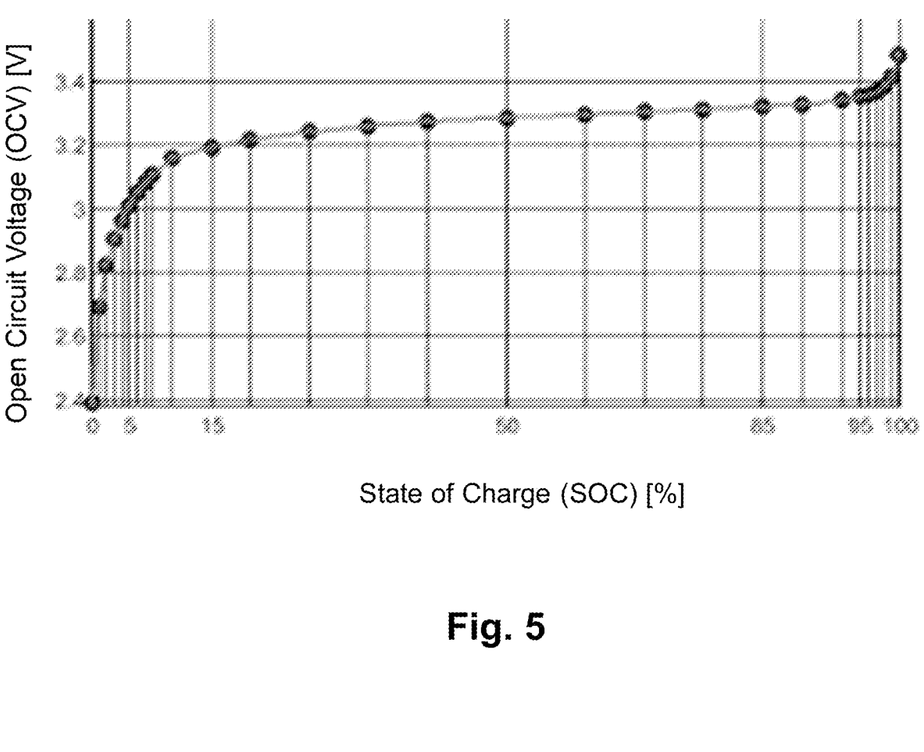
FIG. 5 is a graph illustrating a relationship between SOC and OCV.

As mentioned earlier, the SOC level of the at least one battery cell 203 is not a measurement but is an estimate. There are many different methods for estimating the SOC, for example the Open Circuit Voltage (OCV) method. The OCV method utilizes a curve illustrating the OVC as a function of the SOC to reset or estimate the SOC. However, the curve is rather flat for this type of battery cell 203, but not when at high and low voltage. At high and low voltages, the curve has a large derivative, meaning it is easier to estimate the SOC by reading the OCV voltage. This is one reason for using the combustion engine 208 to charge and discharge the at least one battery cell 203 to the first voltage level and the second level, respectively, and possibly having a relaxation or pause period between the two voltage levels to let the voltage stabilize to the OCV level. The device 200 will perform calibration of the SOC algorithm for estimating the SOC, i.e. resetting or updating the starting point for the SOC estimation, by reading the OCV curve. FIG. 5 is a graph illustrating a relationship between SOC and OCV. The x-axis represents the SOC and the y-axis represents the voltage, also referred to as OCV. In the normal SOC range, e.g. between 15 and 95% SOC, the voltage is rather constant. This means that if a voltage of 3,2V is read from the graph, the SOC can be anything between 40% and 60%. But, if instead a voltage of 3V is read from the graph, then a much better accuracy is obtained, and it is easy to estimate that the SOC is 5%. This is a reason for why the SOC is easier to estimate at the high and low voltages, i.e. the first voltage level and the second voltage level b.

The method for enabling SOC estimation of at least one battery cell 203 comprised in an electrical energy storage system 201 of a hybrid electric vehicle 100 described above will now be described seen from the perspective of the device 200 and illustrated in FIG. 6. The method may be described as for enabling SOC estimation of a battery comprised in an electrical energy storage system 201 where the battery comprises at least one battery cell 203 or described as for enabling SOC estimation in the electrical energy storage system 201 comprising at least one battery cell 203. The device 200 may be a battery management unit or is comprised in a battery management unit of the electrical energy storage system 201. The method in FIG. 5 may be performed while the hybrid electric vehicle 100 is at standstill, i.e. the hybrid vehicle 100 is not moving but it is running, e.g. the ignition has been turned on. No auxiliary loads comprised in the hybrid electric vehicle 100 may be running while the method is performed.

Figure 6:
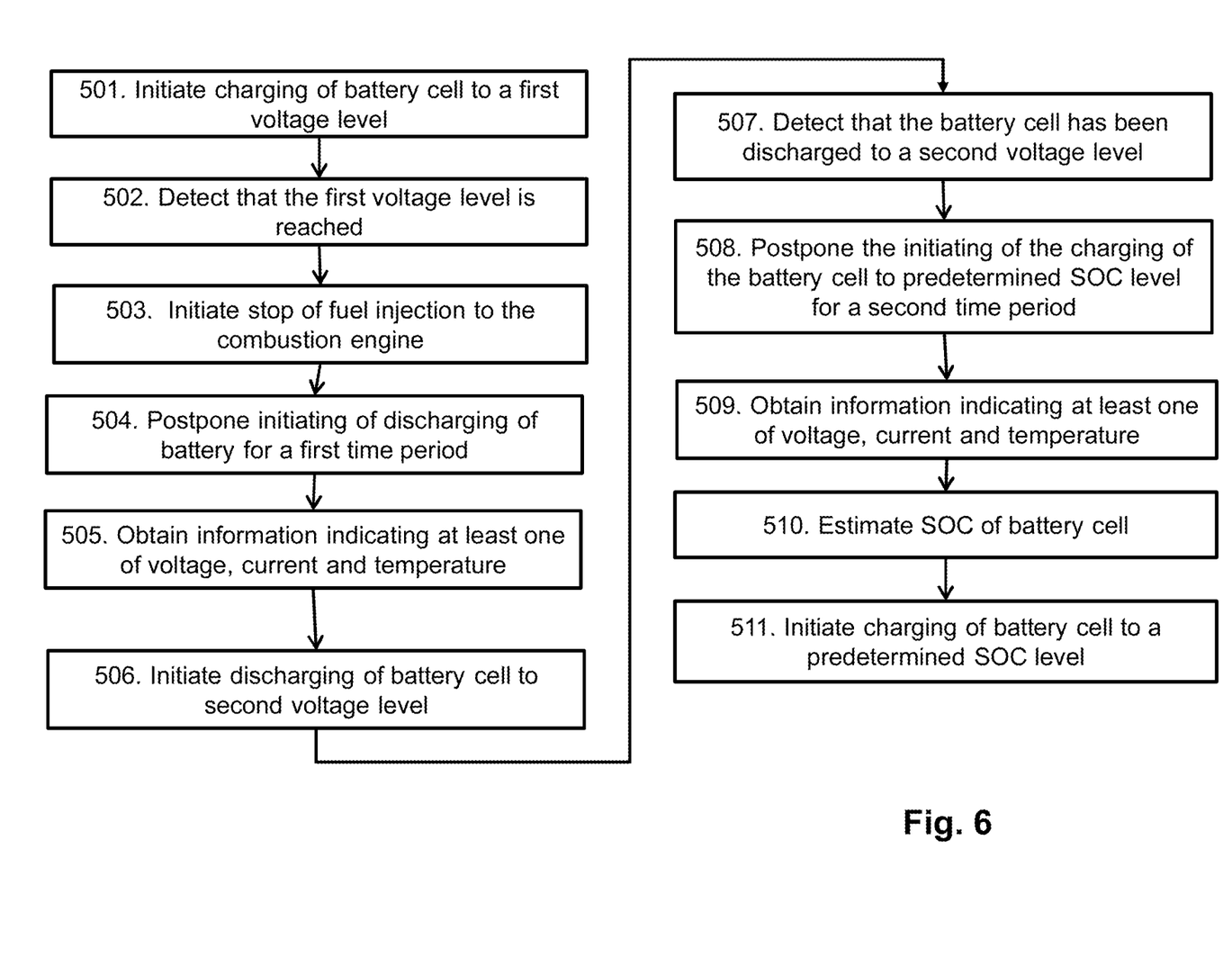
FIG. 6 is a flow chart illustrating a method.

The start of the method illustrated in FIG. 6 may be triggered by any suitable means, for example by obtaining a trigger signal from an aftermark tool, via a cluster, via a trigger signal obtained from an operator device, via an app in a mobile device, e.g. mobile phone, tablet computer etc.

The method seen in FIG. 6 comprises at least one of the following steps, which steps may be performed in any suitable order than described below:

Step 501

This step corresponds to step 301 in FIG. 3a. The device 200 initiates charging of the at least one battery cell 203 to a first voltage level a. The at least one battery cell 203 is charged by an electric machine 205 powered by a combustion engine 208 comprised in the hybrid electric vehicle 100. Fuel is injected into the combustion engine 208 when it powers the electric machine 205.

The first voltage level a may be higher than the second voltage level b.

The at least one battery cell 203 may be comprised in at least one traction voltage battery.

Detecting that the first voltage level a is reached may be done using any suitable method for voltage level detection.

Step 502

This step corresponds to step 303 in FIG. 3a. The device 200 detects that the first voltage level a is reached.

Step 503

This step corresponds to step 304 and step 305 in FIG. 3a. When the first voltage level a is reached, the device 200 initiates stop of fuel injection to the combustion engine 208 and initiates the electric machine 205 to drive the combustion engine 208 with power from the at least one battery cell 203. The at least one battery cell 203 is discharged when used for driving the combustion engine 208.

Step 504

This step corresponds to step 306 in FIG. 3a. Upon detecting that the first voltage level a has been reached, the device 200 may postpone initiation discharging of the at least one battery cell 203 for a first time period. No current or as little current as possible is provided to the electric machine 205 from the at least one battery cell 203 during the first time period.

The first time period may be a first pause period or a first delay period. The first time period may be in the range of a few minutes and up to an hour.

Step 505

This step corresponds to step 307 in FIG. 3a. The device 200 may obtain information indicating at least one of voltage, current and temperature of the at least one battery cell 203 after the first voltage level a has been reached.

Step 506

This step corresponds to step 308, 309 and 310 in FIG. 3a. The device 200 initiates discharging of the at least one battery cell 203 to a second voltage level b. The electric machine 205 drives the combustion engine 208 with power from the at least one battery cell 203 during the discharging.

The at least one battery cell 203 is discharged when used for driving the combustion engine 208.

A goal of using the electric machine 205 to drive the combustion engine 208 is not to drive the powertrain from the combustion engine 208 with combustion fuel, but to waste energy. The powertrain of the vehicle 100 is not driven by the combustion engine 208 with combustion fuel. No fuel will be injected to the combustion engine 208 and the combustion engine 208 will be used backwards. The electric machine 205 will be used to trigger the combustion engine 208 to rotate and friction in the combustion engine 208 will be where energy is wasted.

Step 507

This step corresponds to step 311 in FIG. 3b. The device 200 detects that the at least one battery cell 203 has been discharged to a second voltage level b. The second voltage level b may be lower than the first voltage level a. The SOC estimation of the at least one battery cell 203 is enabled when the second voltage level b has been reached.

Detecting that the second voltage level b is reached may be done using any suitable method for voltage level detection.

When the second voltage level b is reached, the SOC estimation is enabled and may be ready to be performed.

Step 508

This step corresponds to step 312 in FIG. 3b. Upon detecting that the second voltage level b has been reached, the device 200 may postpone the initiating of the charging of the at least one battery cell 203 to the predetermined SOC level for a second time period. No current or as little current as possible may be provided to the electric machine 205 from the at least one battery cell 203 during the second time period. With the second time period, there will be an amount of time between the detection of the discharge to the second voltage level b, i.e. that the SOC calibration has been performed, and the charging to the predetermined SOC level. With the second time period, the voltage at the battery cell 203 may stabilize. No current or a current that is as low as possible is provided to the electric machine 205 from the at least one battery cell 203 during the second time period.

The second time period may be a second pause period or a second delay period. The second time period may have the same duration as the first time period, it may be shorter, or it may be longer than the first time period. The second time period may be in the range of a few minutes and up to an hour.

Step 509

This step corresponds to step 313 in FIG. 3b. The device 200 may obtain information indicating at least one of voltage, current and temperature of the at least one battery cell 203 after the second voltage level b has been reached.

The information indicating at least one of voltage, current and temperature of the at least one battery cell 203 may be obtained a second time period after the second voltage level b has been reached.

Step 510

This step corresponds to step 314 in FIG. 3b. When the at least one battery cell 203 has been discharged to the second voltage level b, the device 200 may estimate the SOC of the at least one battery cell 203.

Step 511

This step corresponds to step 315 in FIG. 3b. Upon detecting that the second voltage level b has been reached, the device 200 may initiate charging of the at least one battery cell 203 to a predetermined SOC level using the electric machine 205 powered by the combustion engine 208 driven by fuel. The predetermined SOC level may be set by an operator, by the device 200 etc. The predetermined SOC level may be between the first voltage level a and the second voltage level b.

The SOC level may be described as the level of charge of the at least one battery cell 203 relative to its capacity. An empty or fully discharged battery cell 203 may have an SOC of 0 or 0%. A fully charged battery cell 203 may have an SOC of 1 or 100%.

The method in FIG. 6 may be stopped after the at least one battery cell 203 has been charged to the predetermined SOC level.

The device 200 is adapted to perform the method described herein, e.g. as illustrated and described with reference to FIG. 3a, FIG. 3b and FIG. 6. The device 200 may be adapted to perform method while the hybrid electric vehicle 100 is at standstill. The device 200 may be adapted to perform the method when no auxiliary loads comprised in the hybrid electric vehicle 100 are running. To perform the method steps shown in FIGS. 3a, 3b and 6 for enabling SOC estimation of at least one battery cell 203 comprised in an electrical energy storage system 201 of a hybrid electric vehicle 100, the device 200 may comprise an arrangement as shown in FIG. 6. The method may be described as a method for enabling SOC estimation of a battery comprised in an electrical energy storage system 201 where the battery comprises at least one battery cell 203 or described as a method for enabling SOC estimation of the electrical energy storage system 201 comprising at least one battery cell 203. The device 200 may be a battery management unit or is comprised in a battery management unit of the electrical energy storage system 201.

Figure 7:
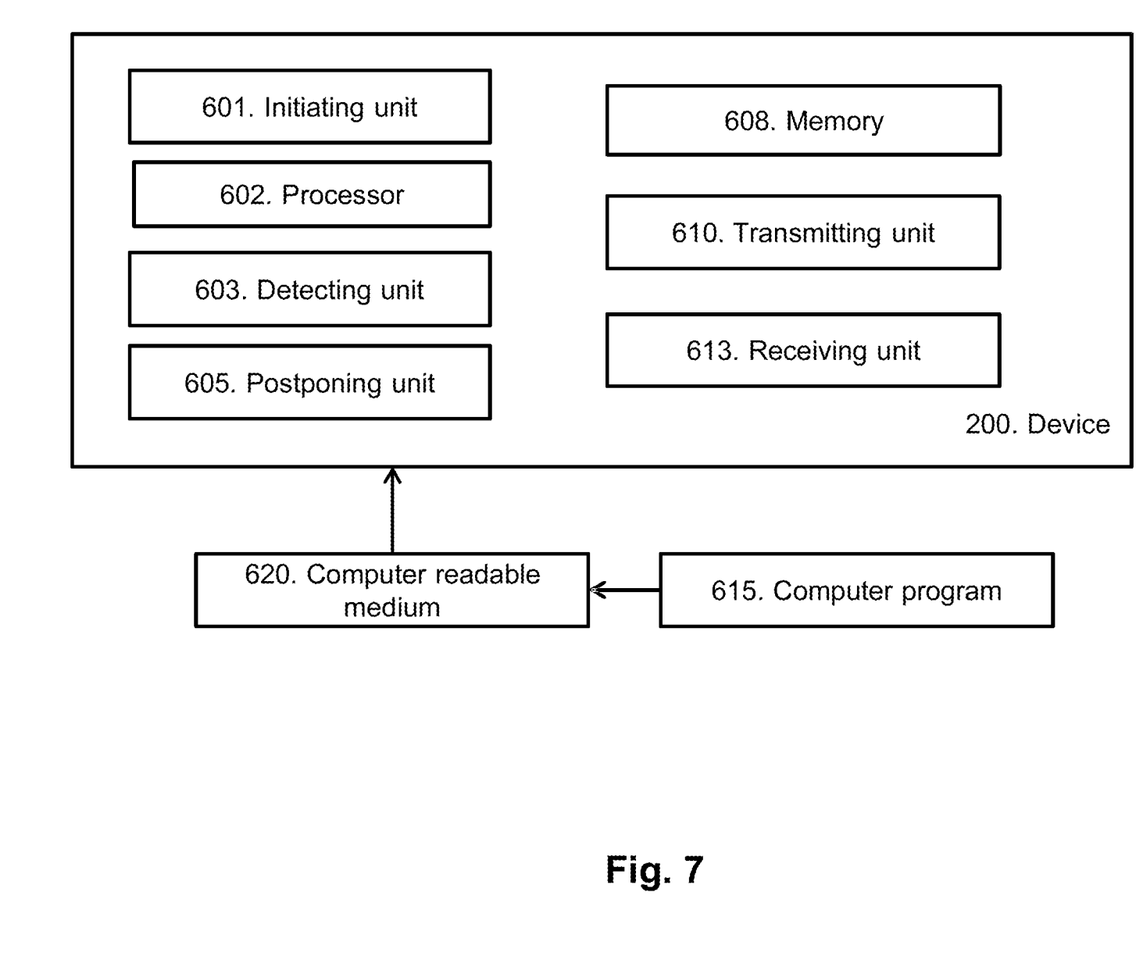
FIG. 7 is a schematic block diagram illustrating a device.

The device 200 is adapted to, e.g. by means of an initiating unit 601, initiate charging of at least one battery cell 203 to a first voltage level. The at least one battery cell 203 is charged by an electric machine 205 powered by a combustion engine 208 comprised in the hybrid electric vehicle 100. The at least one battery cell 203 may be comprised in at least one traction voltage battery. The initiating unit 601 may be a processing unit 602 of the device 200 or comprised in the processing unit 602 of the device 200.

The device 200 is adapted to, e.g. by means of a detecting unit 603, detect that the first voltage level is reached. The detecting unit 603 may be the processing unit 602 of the device 200 or comprised in the processing unit 602 of the device 200.

The device 200 is adapted to, e.g. by means of the initiating unit 601, when the first voltage level is reached, initiate stop of fuel injection to the combustion engine 208.

The device 200 is adapted to, e.g. by means of the initiating unit 601, initiate discharging of the at least one battery cell 203 to the second voltage level. The electric machine 205 drives the combustion engine 208 with power from the at least one battery cell 203 during the discharging. The at least one battery cell 203 is discharged when used for driving the combustion engine 208.

The device 200 is adapted to, e.g. by means of the detecting unit 603, detect that the at least one battery cell 203 has been discharged to a second voltage level b.

SOC estimation of the at least one battery cell 203, e.g. comprised in a battery, is enabled when the second voltage level b has been reached, i.e. the SOC estimation is ready to be performed. The first voltage level a may be higher than the second voltage level b.

The device 200 may be adapted to, e.g. by means of the initiating unit 601, upon detecting that the second voltage level b has been reached, initiate charging of the at least one battery cell 203 to a predetermined SOC level using the electric machine 205 powered by the combustion engine 208 driven by fuel.

The device 200 may be adapted to, e.g. by means of a postponing unit 605, when the first voltage level a is reached, postpone the initiation of discharging of the at least one battery cell 203 for a first time period. No current or as little current as possible may be provided to the electric machine 205 from the at least one battery cell 203 during the first time period. The postponing unit 605 may be the processing unit 602 of the device 200 or comprised in the processing unit 602 of the device 200.

The device 200 may be adapted to, e.g. by means of the postponing unit 605, when the second voltage level b has been reached, postpone the initiating of the charging of the at least one battery cell 203 to the predetermined SOC level for a second time period. No current or as little current as possible may be provided to the electric machine 205 from the at least one battery cell 203 during the second time period.

The device 200 may be adapted to stop performing the after the at least one battery cell 203 has been charged to the predetermined SOC level.

The device 200 may be adapted to, e.g. by means of the processing unit 602, obtain information indicating at least one of voltage, current and temperature of the at least one battery cell 203 after the first voltage level a has been reached and after the second voltage level b has been reached. The information indicating at least one of voltage, current and temperature of the at least one battery cell 203 may be obtained a first time period after the first voltage level a has been reached and a second time period after the second voltage level b has been reached.

The device 200 may be adapted to, e.g. by means of the processing unit 602, when the at least one battery cell 203 has been discharged to the second voltage level b, estimate the SOC of the at least one battery cell 203.

The device 200 may comprises the processor 602 and a memory 608. The memory 608 comprises instructions executable by the processor 602.

The device 200 may comprise a transmitting unit 610 adapted to transmit, e.g. instructions, signals, etc, to other devices and parts of the hybrid electric vehicle 100, e.g. the electric machine 205, the combustion engine 208, the at least one battery cell 203 etc. The transmitting unit 610 may be a transmitter or a transceiver. The transmitting unit 610 and the providing unit 609 may be the same unit.

The device 200 may comprise a receiving unit 613 adapted to receive, e.g. instructions, signals, etc, to other devices and parts of the hybrid electric vehicle 100, e.g. the electric machine 205, the combustion engine 208, the at least one battery cell 203 etc. The receiving unit 613 may be a receiver or a transceiver.

A computer program 615 may comprise instructions which, when executed on at least one processor, cause the at least one processor to carry out the method described herein. A carrier may comprise the computer program 615, and the carrier may be one of an electronic signal, optical signal, radio signal or computer readable storage medium 618.

The hybrid electric vehicle 100 comprises a device 200 as described above.

The method described herein for enabling SOC estimation of at least one battery cell 203, e.g. comprised in a battery, comprised in an electrical energy storage system 201 of a hybrid electric vehicle 100 may be implemented through one or more processors, such as the processor 602 in the device 200 illustrated in FIG. 7, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the device 200. One such carrier may be in the form of a CD ROM disc. It is however feasible with other data carriers such as a memory stick. The computer program code can furthermore be provided as pure program code on a server and downloaded to the device 200.

Summarized, to enable SOC estimation a specific current pattern needs to be provided to the at least one battery cell 203. The cell voltages of the at least one battery cell 203 needs to be monitored and the current adapted to it. A first step is to charge the at least one battery cell 203 to the first voltage level a, e.g. a high cell voltage. This is done using the combustion engine 208 driving the electric machine 205. When the first voltage level a is reached, the device 200 initiates a stop of fuel injection to the combustion engine 208 and initiates the electric machine 205 to drive the combustion engine 208 at idle. This will discharge the at least one battery cell 203, through the electric machine 205. In other words, the at least one battery cell 203 is discharged to the second voltage level b. When the second voltage level b, e.g. a low cell voltage, is reached, the at least one battery cell 203 may be charged to a predetermined SOC. Thus, the SOC estimation is enabled and may be performed by the device 200 at any suitable time and using any suitable SOC estimation method.

The present invention is applicable to a hybrid electric vehicle 100, i.e. a vehicle equipped with a combustion engine 208, electric machine 205 and at least one battery cell 203, e.g. a traction voltage battery cell.

The SOC is an estimate that often drifts from the actual SOC over time. Therefore, SOC calibration of the algorithm that performs the SOC estimation is necessary. The algorithm that performs the SOC estimation may be referred to as an SOC algorithm, and it is this SOC algorithm that may be calibrated. The calibration of the SOC algorithm may comprise at least some of following steps:

a) Charging to the first voltage level, e.g. high voltage.
    b) Pause/wait
    c) Read voltage/current/temperature
    d) Discharging to the second voltage level, e.g. low voltage.
    e) Pause/wait
    f) Read at least one of: voltage, current and temperature.

After charging and discharging, the battery cell 203 may be considered to be in a charging state that is a correct and good starting point for the SOC estimation. The SOC estimation may be performed after steps a)-f).

The present invention enables to enable battery SOC estimation following a certain voltage/current pattern over a short time, using a current produced by the electric machine 205 driven by the combustion engine 208. The method described herein is performed when the hybrid electric vehicle 100 is at standstill and auxiliary loads comprised in the hybrid vehicle 100 are disabled, i.e. they are not running.

The at least one battery cell 203 may comprise or be connected to a voltage sensor. The device 200 may obtain information about the voltage from the voltage sensor, possibly together with information about temperature and current. The information from the voltage sensor provides a SOC estimation, which will drift with time. However, if the at least one battery cell 203 is put in a certain condition, herein the first voltage level and second voltage level, and possibly after a small rest period, then the SOC algorithm may be reset, i.e. calibrated, to better accuracy by directly reading the voltage of the at least one battery cell 203.

The invention relates to a method for enabling SOC estimation of at least one battery cell in a hybrid electric vehicle 100 at standstill so as to overcome the problem of SOC calibration not being performed automatically, e.g. when the hybrid electric vehicle 100 is not off for a long enough time period. The invention eliminates the need to connect an external charger to perform the SOC calibration.

The term "at least one of A and B" should be understood to mean "only A, only B, or both A and B.", where A and B are any parameter, number, indication used herein etc.

The term "adapted to" used herein may also be referred to as "arranged to", "configured to", "capable of" or "operative to".

It is to be understood that the present invention is not limited to the embodiments described herein and illustrated in the drawings; rather, the skilled person will recognize that many changes and modifications may be made within the scope of the appended claims.

The invention claimed is:

1. A method performed by a device for enabling State of Charge (SOC) estimation of at least one battery cell comprised in an electrical energy storage system of a hybrid electric vehicle, the method being performed while the hybrid electric vehicle is at standstill and no auxiliaries loads in the hybrid electric vehicle are running, and comprising:
   initiating charging of the at least one battery cell to a first voltage level, wherein the at least one battery cell is charged by an electric machine powered by a combustion engine comprised in the hybrid electric vehicle;
   detecting that the first voltage level is reached;
   when the first voltage level is reached, initiating stop of fuel injection to the combustion engine;
   initiating discharging of the at least one battery cell to a second voltage level based on fuel injection to the combustion engine being stopped, wherein the electric machine drives the combustion engine with power from the at least one battery cell during the discharging, wherein the at least one battery cell is discharged when used for driving the combustion engine; and
   detecting that the at least one battery cell has been discharged to the second voltage level, wherein SOC estimation of the at least one battery cell is enabled when the second voltage level has been reached.

2. The method according to claim 1, comprising:
   when the at least one battery cell has been discharged to the second voltage level, estimating the SOC of the at least one battery cell.

3. A device being adapted to perform the method according to claim 2.

4. The method according to claim 1, comprising:
   upon detecting that the second voltage level has been reached, initiating charging of the at least one battery cell to a predetermined State of Charge, SOC, level using electric machine powered by the combustion engine driven by fuel.

5. The method according to claim 4, comprising:
   upon detecting that the second voltage level has been reached, postponing the initiating of the charging of the at least one battery cell to the predetermined SOC level for a second time period.

6. The method according to claim 1 comprising:
   upon detecting that the first voltage level has been reached, postponing initiation discharging of the at least one battery cell for a first time period.

7. The method according to claim 1, comprising:
   obtaining information indicating at least one of voltage, current and temperature of the at least one battery cell after the first voltage level has been reached and after the second voltage level has been reached.

8. The method according to claim 7, wherein the information indicating at least one of voltage, current and temperature of the at least one battery cell is obtained a first time period after the first voltage level has been reached and a second time period after the second voltage level has been reached.

9. The method according to claim 1, wherein the first voltage level is higher than the second voltage level.

10. The method according to claim 1, wherein the at least one battery cell is comprised in at least one traction voltage battery.

11. The method according to claim 1, wherein the device is a battery management unit or is comprised in a battery management unit of the electrical energy storage system.

12. The method according to claim 1, wherein the method is performed while the hybrid electric vehicle is at standstill and no auxiliaries loads comprised in the hybrid electric vehicle are running.

13. A non-transitory computer readable medium carrying a computer program comprising program code for performing the steps of claim 1, when said program code is run on a computer.

14. A device for enabling State of Charge (SOC) estimation of at least one battery cell comprised in an electrical energy storage system of a hybrid electric vehicle, wherein the device is adapted to, while the hybrid electric vehicle is at standstill and no auxiliaries loads comprised in the hybrid electric vehicle are running:
   initiate charging of at least one battery cell to a first voltage level, wherein the at least one battery cell is charged by an electric machine powered by a combustion engine comprised in the hybrid electric vehicle;
   detect that the first voltage level is reached;
   when the first voltage level is reached, initiate stop of fuel injection to the combustion engine;
   initiate discharging of the at least one battery cell to a second voltage level based on fuel injection to the combustion engine being stopped, wherein the electric machine drives the combustion engine with power from the at least one battery cell during the discharging, wherein the at least one battery cell is discharged when used for driving the combustion engine;
   detect that the at least one battery cell has been discharged to a second voltage level, wherein SOC estimation of the at least one battery cell is enabled when the second voltage level has been reached.

15. The hybrid electric vehicle comprising the device according to claim 14.

* * * * *